US009671157B2

(12) United States Patent
Boarman et al.

(10) Patent No.: US 9,671,157 B2
(45) Date of Patent: Jun. 6, 2017

(54) APPARATUS, METHOD AND SYSTEM FOR MANAGING AND DISPENSING LIQUID ENHANCEMENT COMPONENTS FROM A REFRIGERATOR

(71) Applicant: Whirlpool Corporation, Benton Harbor, MI (US)

(72) Inventors: Patrick J. Boarman, Evansville, IN (US); John M. Knight, Saint Joseph, MI (US); Tiemen Van Dillen, Varese (IT)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 14/997,838

(22) Filed: Jan. 18, 2016

(65) Prior Publication Data

US 2016/0131419 A1 May 12, 2016

Related U.S. Application Data

(63) Continuation of application No. 12/915,100, filed on Oct. 29, 2010, now Pat. No. 9,267,730.

(51) Int. Cl.

| | |
|---|---|
| ***A23L 1/00*** | (2006.01) |
| ***B67D 1/00*** | (2006.01) |
| ***A47J 31/42*** | (2006.01) |
| ***A47J 31/40*** | (2006.01) |
| ***F25D 23/12*** | (2006.01) |
| ***B67D 3/00*** | (2006.01) |
| ***B67D 7/80*** | (2010.01) |

(52) U.S. Cl.
CPC ......... *F25D 23/126* (2013.01); *B67D 3/0012* (2013.01); *B67D 7/80* (2013.01)

(58) Field of Classification Search
CPC .... F25D 23/061; F25D 23/062; F25D 23/126; F25D 2400/06; B67D 3/0012; B67D 7/80; F25C 5/005
USPC ....................... 99/275, 279, 286, 287, 289 R
See application file for complete search history.

(56) References Cited

U.S. PATENT DOCUMENTS

| | | | |
|---|---|---|---|
| 4,169,359 | A | 10/1979 | Weerstra |
| 4,324,494 | A | 4/1982 | Pryor et al. |
| 4,366,920 | A | 1/1983 | Greenfield et al. |
| 4,895,308 | A | 1/1990 | Tanaka |
| 5,619,901 | A | 4/1997 | Reese et al. |
| 5,676,040 | A | 10/1997 | Ford |
| 5,845,561 | A | 12/1998 | Chigira et al. |
| 6,095,032 | A | 8/2000 | Barnett et al. |
| 6,289,948 | B1 | 9/2001 | Jeannin et al. |
| 6,470,920 | B2 | 10/2002 | Jeannin et al. |
| 6,612,224 | B2 | 9/2003 | Mercier et al. |
| 6,988,444 | B1 | 1/2006 | Pfeifer et al. |
| 7,048,149 | B1 | 5/2006 | Lassota |

(Continued)

*Primary Examiner* — Dana Ross
*Assistant Examiner* — Lindsey C Staubach
(74) *Attorney, Agent, or Firm* — Nyemaster Goode, P.C.

(57) ABSTRACT

A refrigerator or liquid dispensing appliance adapted for receiving, storing, managing, processing and dispensing a liquid enhancement component for preparation of a finished beverage is disclosed. Delivery, processing and management of the liquid enhancement component includes loading a solid liquid enhancement component at a product interface, and managing the transfer of the liquid enhancement component through various systems of the invention including processing to provide a processed liquid enhancement component for discharging for preparing a finished beverage.

20 Claims, 7 Drawing Sheets

(56) References Cited

U.S. PATENT DOCUMENTS

| | | | |
|---|---|---|---|
| 7,240,610 | B2 | 7/2007 | Wimmer et al. |
| 7,469,627 | B2 | 12/2008 | Li |
| 7,533,602 | B2 | 5/2009 | Fukushima et al. |
| 2004/0233781 | A1 | 11/2004 | Dickson, Jr. et al. |
| 2007/0209522 | A1 | 9/2007 | Bigge et al. |

APPARATUS, METHOD AND SYSTEM FOR MANAGING AND DISPENSING LIQUID ENHANCEMENT COMPONENTS FROM A REFRIGERATOR

CROSS-REFERENCE TO RELATED APPLICATIONS

The present invention is a continuation of U.S. patent application Ser. No. 12/915,100 filed on Oct. 29, 2010.

FIELD OF THE INVENTION

The present invention relates to delivering and management of liquid enhancement components from a liquid dispensing appliance, and more particularly, to apparatuses, methods and systems for storing, managing, and mixing and delivering a liquid enhancement component from a refrigerator for dispensing or preparing beverage.

BACKGROUND OF THE INVENTION

Dispensing liquid from an indoor dispenser of a refrigerator is well known. In fact, many new and existing refrigerators have an indoor or other dispenser having a liquid outlet to dispense liquid from the refrigerator. Although these existing refrigerators can dispense liquid from a dispenser, including ice from an ice dispenser, no concept or platform exists where the refrigerator, or other liquid dispensing appliance, is configured to receive, store, transfer, process and discharge, otherwise oversee the management of such process, for preparing beverages at the appliance. Therefore, a need has been identified in the art to provide a refrigerator, or other liquid dispensing appliance, having the advantage of being able to receive, store, manage and process a liquid enhancement component in a solid form for dispensing to prepare a beverage at the appliance for drinking or for other uses.

BRIEF SUMMARY OF THE INVENTION

An aspect of the present invention to provide a refrigerator equipped with a system for receiving, managing, processing, and discharging a liquid enhancement component for preparing a beverage at the appliance.

Yet another aspect of the present invention is to provide a liquid dispensing appliance having an interface for receiving a solid liquid enhancement component, and storing, managing, processing and discharging the component for preparation of a beverage at the appliance.

One of these and/or other aspects of the present invention will become apparent from the specification and claims that follow.

According to an aspect of the present invention, a refrigerator is disclosed. The refrigerator includes a cabinet body and product intake associated with the cabinet body. The intake is configured to receive a liquid enhancement component in solid form. The refrigerator also includes a delivery system connected in communication with the intake; the delivery system includes means for transferring the liquid enhancement component from the intake to at least one product discharge. The refrigerator also includes a processing system connected in communication with the delivery system; the processing system includes means for reducing the liquid enhancement component in particle size to be more readily dissolvable in a liquid, and a product discharge associated with the cabinet body; the discharge being connected in communication with the delivery system and configured to disperse a measured portion of a process liquid enhancement component to a dispenser for mixing with a liquid for preparing a beverage. The product input includes a receiving envelope having a geometry matching a defining geometry for the liquid enhancement component. The means for reducing the liquid enhancement component and particle size includes a device having one or more members for contacting the liquid enhancement component to reduce in particle size to be more readily dissolvable in a liquid.

According to another aspect of the present invention, a liquid enhancement component delivery and dispensing management system for a liquid dispensing appliance is disclosed. The system includes a product intake associated with the liquid dispensing appliance; the intake is configured to receive a liquid enhancement component in solid form. The system also includes a processing system in communication with the product intake; the processing system including means for reducing the liquid enhancement component in particle size for being more readily dissolvable in a liquid. A product discharge is associated with the cabinet body where the discharge is connected in communication with the processing system and configured to disperse a quantified portion of a processed liquid enhancement component to a dispenser on the appliance for mixing with a liquid for preparing a beverage. The system also includes a delivery system connected in communication with the product intake; the delivery system includes a means for transferring the liquid enhancement component from the intake to at least one product discharge by means of pneumatic force, mechanical force, or gravity.

According to another aspect of the present invention, a new method for managing delivery and dispensement of liquid enhancement components from a liquid dispensing appliance is disclosed. The method includes the steps of loading a liquid enhancement component in solid form into the appliance through a product intake, communicating the liquid enhancement component to a processing system, reducing the particle size of the liquid enhancement component to be more readily dissolvable in a liquid, and dispersing a quantified amount of the processed liquid enhancement component for mixing with a liquid for preparing a beverage. The method also includes the step of storing one or more liquid enhancement components in the appliance before or after processing, and reducing the particle size of the liquid enhancement component by grinding, crushing or breaking apart the liquid enhancement component.

One aspect of the present invention includes a precision ice guide that reduces kinetic energy of ice cubes entering into a glass to reduce splash and noise.

Another aspect of the present invention includes a precision ice guide that is easily removable from an appliance to facilitate various sized containers.

Yet another aspect of the present invention includes a precision ice guide that is customer installable and removable.

Still another aspect of the present invention includes a precision ice guide that prevents ice spray.

Another aspect of the present invention is a precision ice guide that is washable.

Another aspect of the present invention is a precision ice guide that can be sold in different colors and designed to match or accessorize the appliance.

Another aspect of the present invention is a precision ice guide that can be sold as an accessory for existing appliances or as an attachment for new refrigerators.

These and other aspects, objects, and features of the present invention will be understood and appreciated by those skilled in the art upon studying the following specification, claims, and appended drawings.

BRIEF DESCRIPTION OF THE DRAWINGS

While the specification concludes with the claims particularly pointing out and distinctly claiming the invention, it is believed that the present invention will be better understood from the following description taken in conjunction with the accompanying drawings, in which:

DETAILED DESCRIPTION OF THE PREFERRED EMBODIMENTS

The present invention is directed to a refrigerator and other liquid dispensing devices and appliances such as a countertop/tabletop water dispenser, water dispensing cabinet, or beverage vending machine. In particular, the present invention provides for a refrigerated appliance, or other liquid dispensing device or appliance, having an interface for receiving a liquid enhancement component in solid form, managing, processing and dispersing a quantified portion of the processed liquid enhancement component for preparing a beverage at the appliance.

Figure 1:
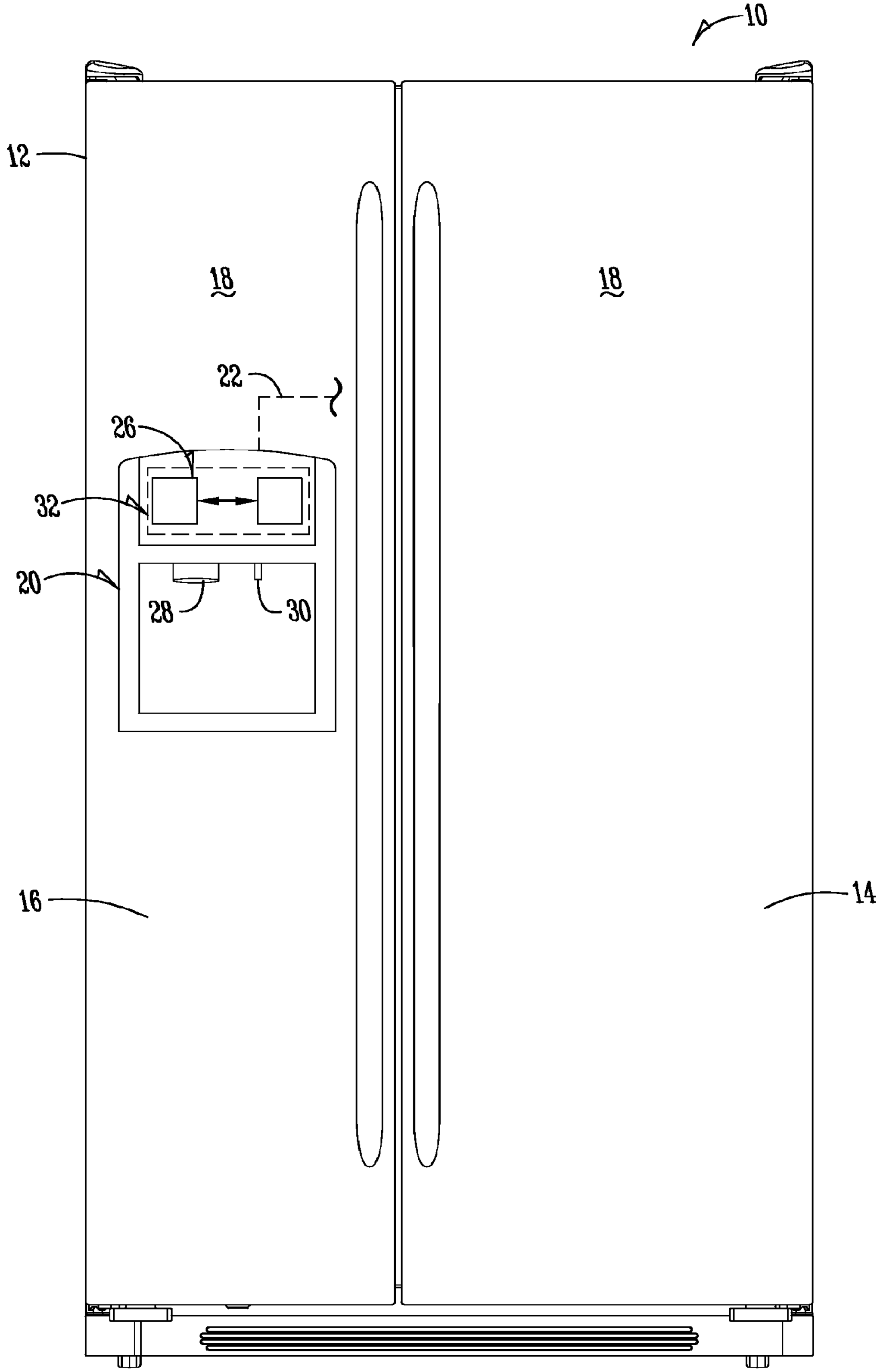
FIG. 1 is a front elevation view of a refrigerator illustrating a system for managing, processing and dispersing a liquid enhancement component for preparing a beverage according to one aspect of the present invention.

FIG. 1 illustrates a refrigerator 10 having a cabinet body 12 including a refrigerated compartment 14 and a freezer compartment 16 associated with the cabinet body 12. The refrigerator 10 includes a dispenser, such as a liquid and/or ice/water dispenser 20 in one of the doors 18 of the refrigerator 10. As is customary, the dispenser 20 receives liquid from a liquid source 22 such as a plumbed water line associated with a domestic, commercial or residential dwelling. The liquid source 22 could also be a bottled source such as where water is stored and dispensed from a bottle at or remote to the refrigerator. Liquid from liquid source 22 may be stored in a liquid holding reservoir (not shown), before or after being filtered through an inline filter, and communicated to the beverage dispensing system 32 at the dispenser 20. The dispenser 20 includes one or both of an ice dispenser 28 and liquid dispenser 30 for dispensing ice and/or liquid from the dispenser. Dispenser 20 also includes a beverage preparation system 24 in operable communication with a liquid enhancement system 26. The beverage preparation system 24 and liquid enhancement system 26 operate together to provide a beverage dispensing system 32 at the dispenser 20.

FIG. 1 illustrates the beverage dispensing system 32 in combination with the indoor dispenser of a refrigerated appliance. The present invention contemplates the beverage dispensing system 32 illustrated in FIG. 1 in combination with other liquid dispensing appliances, cabinets or devices. For example, the beverage dispensing system 32 could be configured in combination with a countertop water dispenser, a tabletop water dispenser, a water dispensing cabinet, a beverage vending machine, or other various types of liquid dispensing devices/appliances.

Figure 2:
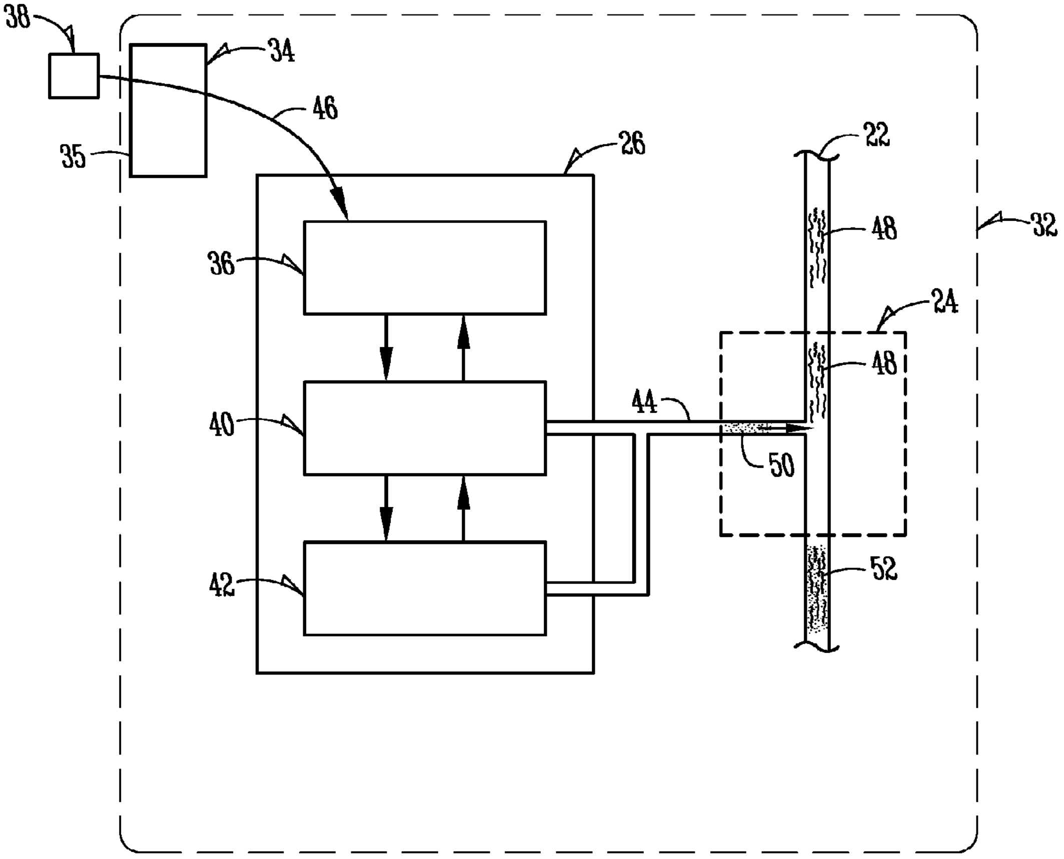
FIG. 2 is a diagram illustration according to one exemplary embodiment of the present invention.

FIG. 2 is a illustration of a diagram characterizing various components of a beverage dispensing system 32 according to one aspect of the invention. The beverage dispensing system 32 provides an interface such as a loading interface 35 at the beverage dispensing appliance. For example, the refrigerator 10 illustrated in FIG. 1 may include a loading interface 35 positioned on the cabinet body 12 such as in one of the doors 18. The loading interface 35 may also be configured into the operator interface of dispenser 20. The loading interface 35 is meant to be a location associated with the liquid dispensing appliance where a user or operator can conveniently load a liquid enhancement component, such as a solid concentrate, into the liquid dispensing appliance. The loading interface 35 can be configured in an exterior portion, such as an exterior skin of the liquid dispensing appliance, or an interior portion such as a refrigerator or freezer compartment associated with a refrigerated appliance. The loading interface 35 is operated by a concentrate loading system 34 adapted to provide a product intake functionality for receiving from an operator or user a liquid enhancement component into the liquid dispensing appliance. Further description and details of the loading system 34 will be provided infra FIGS. 3A-4B.

The loading system 34 is in operable communication with liquid enhancement system 26. A liquid enhancement component 38 is introduced into the system through loading interface 35 which by way of loading system 34 communicates the liquid enhancement component 38 to the liquid enhancement system 26. The liquid enhancement system 26 provides one or more of the functions of storing, managing, processing, and delivering a liquid enhancement component 38 to a discharge associated with the liquid dispensing appliance for facilitating preparation of a beverage. In an aspect of the invention, the liquid enhancement system 26 includes a liquid enhancement storage system 36, a liquid enhancement transfer system 40 and a liquid enhancement processing system 42. The liquid enhancement storage system 36 provides a location or point where the liquid enhancement component 38 introduced into the liquid dispensing appliance may be stored or staged before or after processing. Embodiments of the present invention include a liquid enhancement system 26 configured without a liquid enhancement storage system 36. Further details and description are provided for the liquid enhancement storage system 36 supra FIGS. 5A-5B.

The liquid enhancement system 26 also includes a liquid enhancement transfer system 40. The liquid enhancement transfer system 40 is responsible for providing communication of the liquid enhancement component 38 from the loading interface 35 through processing and discharge. The liquid enhancement transfer system 40 provides communication of a processed or unprocessed liquid enhancement component 38 to and from the liquid enhancement storage system 36, the liquid enhancement processing system 42, the loading system 34 and the beverage preparation system 24. The liquid enhancement transfer system 40 may also provide for temporary or intermediate storage or staging of unprocessed or processed liquid enhancement components. Further description for the liquid enhancement transfer system 40 is provided infra FIGS. 5A-5B.

Liquid enhancement system 26 also includes a liquid enhancement processing system 42. The processing system 42 prepares the liquid enhancement component 38 to be more readily dissolvable in a liquid. For example, in one aspect of the invention as further described and illustrated infra at FIG. 6A-B, reduces the particle size of the liquid enhancement component 38 from the size of the component when introduced into the beverage dispensing system 32 to be more readily dissolvable or useable in the preparation of a beverage. The various systems included in the liquid enhancement system 26 may be connected in communication with each other via a material or product transfer channel 44. For example, a material or product transfer channel 44 may be used to communicate processed liquid enhancement component 50 to the beverage preparation system 24. The product or material transfer channel 44 could also be used to communicate an unprocessed liquid enhancement component to the beverage preparation system 24. The beverage preparation system 24 may be configured to combine the processed liquid enhancement component 50 with liquid 48 from the liquid source 22 so as to dispense a finished beverage 52. Alternatively, the beverage preparation system 24 may be configured so that an unprocessed liquid enhancement component is dispensed or discharged into a cup or receptacle placed at the discharge associated with the beverage preparation system 24. Thus, an unprocessed or processed liquid enhancement component 50 may be discharged into a cup or receptacle before or after, or simultaneously with the discharge of liquid 48 from liquid source 22 into a cup or receptacle. The discharge of the processed liquid enhancement component 50 and liquid 48 from the beverage preparation system 24 provides a system for preparing a finished or complete beverage 52.

FIGS. 3A-4B provide illustrations characterizing various potential embodiments for the liquid enhancement component loading system 34 of the present invention. The loading system 34 may be configured to handle various solid forms of a liquid enhancement component. For example, the loading system 34 may be configured to receive a liquid enhancement component in pellet, tablet, disc, donut, or stick shape to name just a few. Other geometric solid shapes are contemplated by this invention as the loading system 34 could be configured to receive any number of solid geometric shapes for a liquid enhancement component. Use of the term "solid" is to be interpreted as non-viscous, but including pliable and other formable types of solid liquid enhancement components. The liquid enhancement component includes any flavoring component, a soluble component, or non-soluble component. The liquid enhancement component 38 could also include a powder, a brew such as from tea, coffee or alcohol, a nutraceutical, a medicine, a mineral, a vitamin, or an aroma. The present invention contemplates that the liquid enhancement component 38 could be any combination of the aforementioned liquid enhancement components. The liquid enhancement component 38 could also be any combination of the aforementioned liquid enhancement components where one component interacts with another or with liquid being dispensed from the liquid dispensing appliance.

Figure 3A:
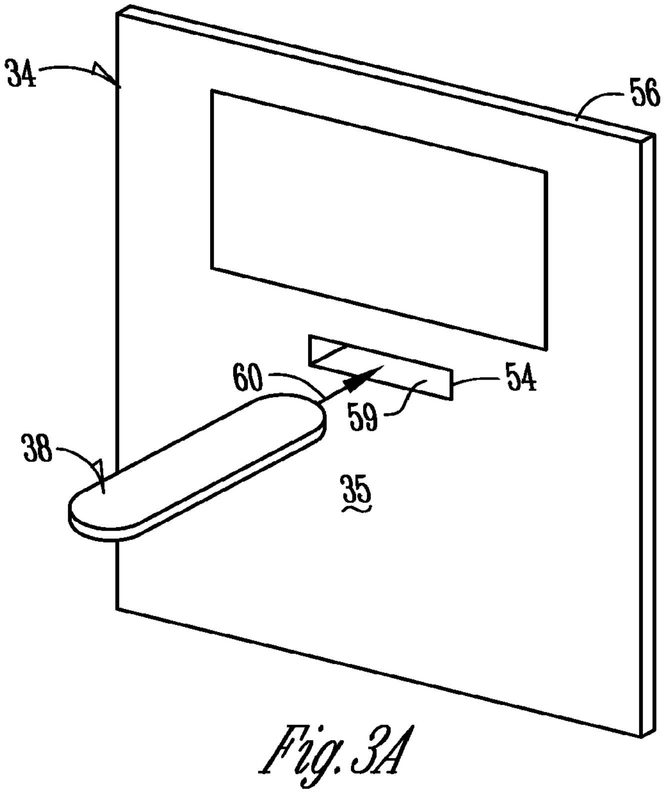
FIGS. 3A-3B are illustrations depicting various designs for a product intake of the present invention.

FIG. 3A illustrates one form for a liquid enhancement component loading system 34 of the invention. The loading system 34 illustrated in FIG. 3A includes a loading interface 35 through which a user or operator inserts or introduces a liquid enhancement component 38 into the beverage dispensing system 32. The loading interface 35 may be configured or positioned in the liquid dispensing appliance at a location conveniently accessible to the operator or user. The loading interface 35 could be configured either internally or externally on the appliance. The loading system 34 includes a product intake 54 at the loading interface 35. The product intake 54 is configured with a receiving envelope 59 having in one embodiment of the invention a geometric shape configured to receive a liquid enhancement component of similar geometric shape 38. This is accomplished, for example, by inserting liquid enhancement component 38 into the product intake 54 as illustrated by arrow 60. A display 56 may be included with the loading system 34 to apprise the user or operator of the status, types, and amount of loaded liquid enhancement component, and any other information relevant to the operation of the loading system 34 or the overall beverage dispensing system 32.

Figure 3B:
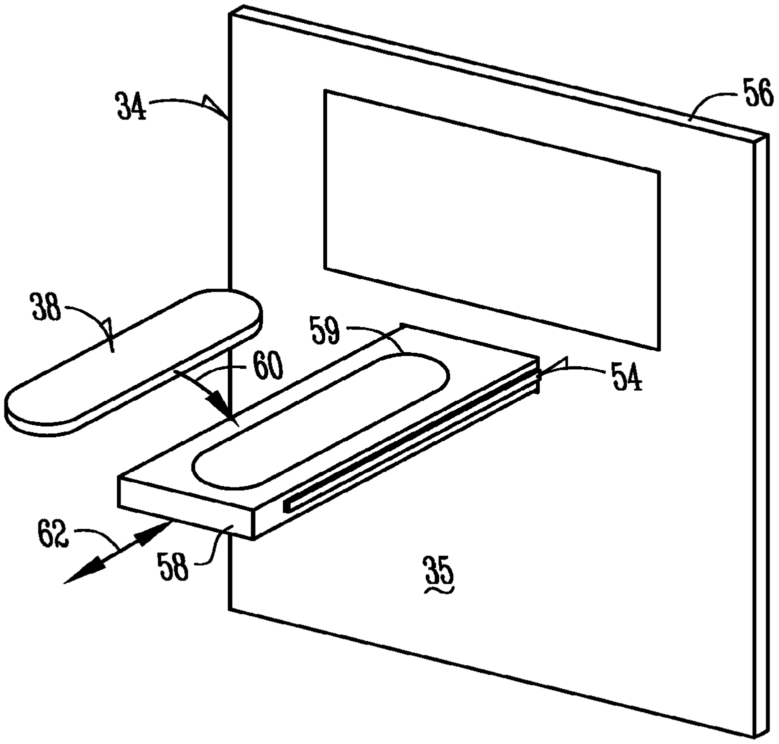
Figure 4A:
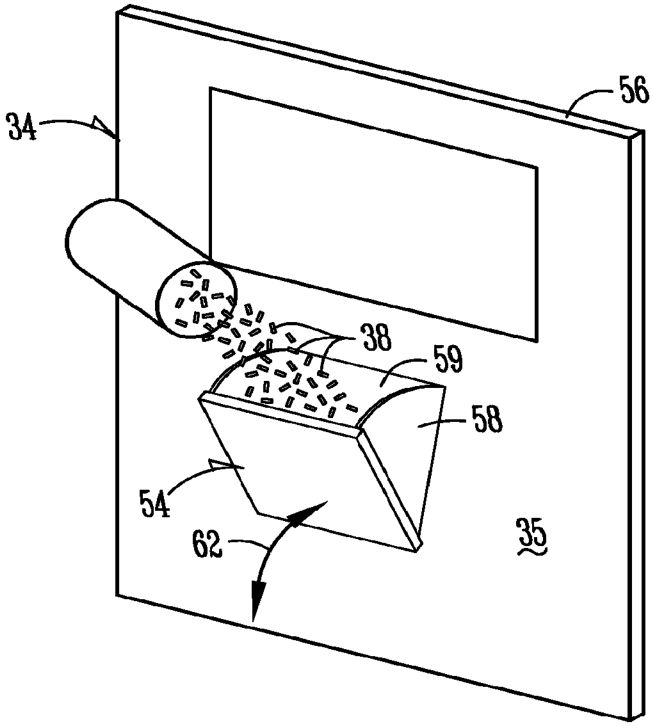
FIGS. 4A-4B illustrate various depictions for other product intake interfaces of the present invention.
Figure 4B:
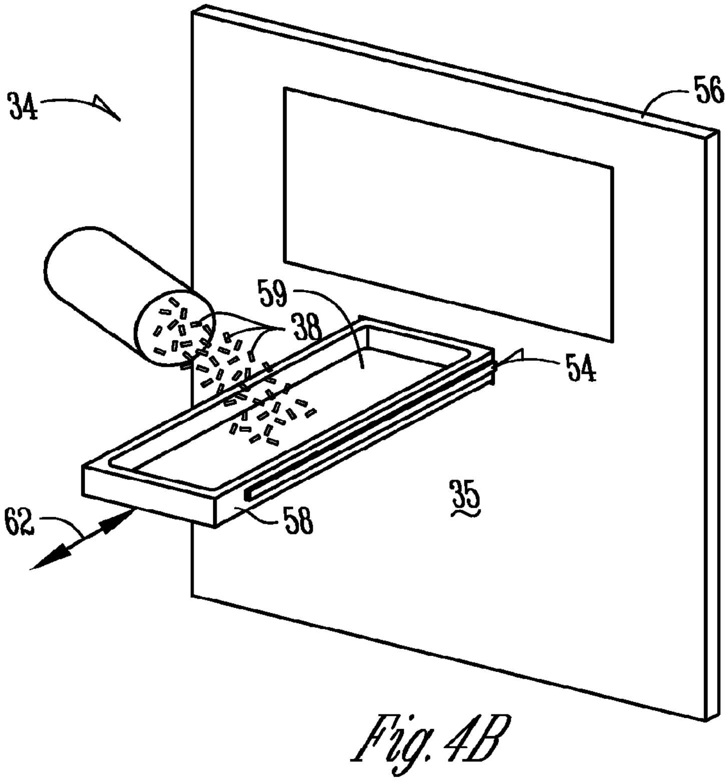

FIGS. 3B, 4A and 4B illustrate different embodiments for the liquid enhancement component loading system 34 of the invention. In FIG. 3B the loading system 34 includes a loading interface 35 as previously described and a product intake 54. The product intake 54 comprises a drawer 58 that is moveable in and out of the loading interface 35 either manually or automatically. For example, display 56 could include a user/operator interface for providing instruction to the loading system 34 for operating drawer 58. In the extended position, the drawer 58 allows access to a receiving envelope 59. The receiving envelope 59 may be configured in a geometric shape matching a defining geometry for the liquid enhancement component 38. For example, in the case where the liquid enhancement component 38 is in the shape of a stick, the receiving envelope 59 may be shaped in a matching geometry whereby the liquid enhancement component 38 is inserted into the receiving envelope 59 as indicated by arrow 60. The receiving envelope 59 may be configured in a generic shape such as a basin or bin to allow for a liquid enhancement component 38 to be inserted into the receiving envelope 59 of product intake 54 (see FIG. 4B). The drawer 58 is configured to move in and out of the concentrate loading interface 35 as indicated by arrow 62. The product intake may be configured with multiple receiving envelopes for introducing different types of liquid enhancement components into the loading interface 35. The different types of liquid enhancement components could include different flavor types, geometric shapes, or other properties that define the make-up of the liquid enhancement component. The drawer 58 could be manually inserted into the loading interface 35 or by automation through inputting a command via the control panel 56 retracted into the loading interface 35.

FIGS. 4A-4B illustrate further embodiments of a liquid enhancement component loading system 34 of the invention. In FIG. 4A the loading interface 35, as with previous embodiments, includes a product intake 54. The product intake 54 in FIG. 4A comprises a pivoting door 58 that moves in and out of the loading interface 35 as illustrated by arrow 62. The product intake 54 includes a receiving envelope 59 through which the liquid enhancement component 38 is received and introduced into the beverage dispensing system 32. In one form of the invention, the liquid enhancement component may be in the form of pellets, tablets, discs or donuts poured from a container into the receiving envelope 59 of the product intake 54. The receiving envelope 59 may be configured in geometric shape according to the type and shape of the liquid enhancement component being introduced at the loading interface 35. Additionally, the product intake 54 may be configured with multiple, separated receiving envelopes 59 for introducing liquid enhancement components of different type and shape into the beverage dispensing system 32. A display 56 apprises a user or operator of the status of the loading system 34. The display 56 may also be configured to monitor the position of drawer 58, including the type or types of liquid enhancement component introduced through the receiving envelope 59 of the product intake 54. The display 56 could also be used to apprise the user or operator when the beverage dispensing system 32 is in need of additional liquid enhancement components for processing or preparing a beverage. Additionally, the display 56 may include a user interface where the operator or user inputs instruction for controlling the beverage dispensing system 32. This could include setting and controlling operational parameters for any one of the aforementioned systems of the invention. For example, the operator could input using the user interface and view via the display 56 the desired amount of liquid enhancement component to be dispensed or discharged from the system for preparing a beverage of a desired concentrate level.

FIG. 4B illustrates another embodiment for the loading system 34 according to one aspect of the invention. The loading system 34 in FIG. 4B is similar to the loading system illustrated in FIG. 3B. The receiving envelope 59 of the product intake 54 illustrated in FIG. 4B comprises a bin or basin for holding a specified amount of a liquid enhancement component. A liquid enhancement component is introduced into the product intake 54 by a user or operator. The liquid enhancement component 38 could be in the form of pellets, tablets, disc or donut geometric shapes, or any other solid geometric shape. The liquid enhancement component 38 is poured into the receiving envelope 59 to introduce the liquid enhancement component into the loading interface 35 of the beverage dispensing system 32. Drawer 58 is operated manually or automatically. The drawer 58 moves in and out of the loading interface 35 as indicated by arrow 62.

Figure 5A:
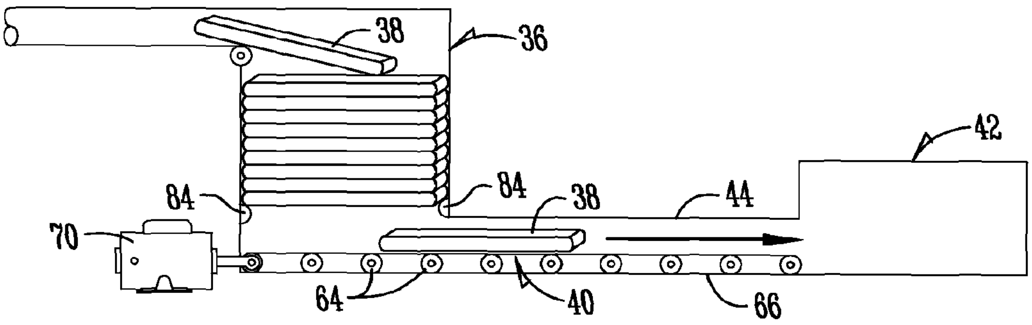
FIGS. 5A-5B are an illustration depicting embodiments for a delivery system for handling the liquid enhancement component.
Figure 5B:
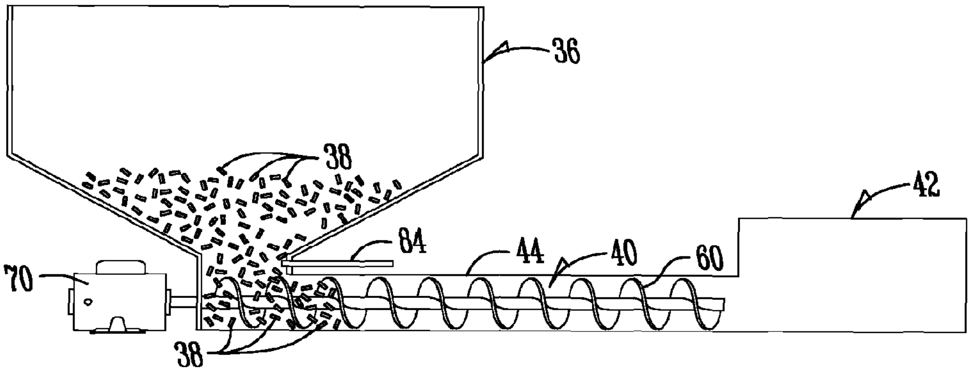

FIGS. 5A-5B illustrate both storage 36 and transfer 40 systems according to exemplary embodiments of the present invention. In the case where the beverage dispensing system 32 is processing the liquid enhancement component 38, the storage system 36 may be placed either upstream or downstream of the storage system 36. The storage system is configured to store one or more types of unprocessed or processed liquid enhancement components. Preferably, the storage system 36 is configured to store one or more types of an unprocessed liquid enhancement component received through the loading system 34. The storage system 36 is preferably located prior to the processing system 42 as illustrated in FIGS. 5A-5B. The storage system 36 could be configured as a temporary or intermediate storage or staging location for both processed and/or unprocessed liquid enhancement components. As illustrated in FIGS. 5A and 5B, liquid enhancement component, of varying type and geometric shape, introduced at the loading system 34 is communicated by transfer system 40 to a storage system 36. The temporary holding or staging location for the liquid enhancement component can be configured or may comprise a bin, channel or reservoir suitable for housing, storing or staging any number of liquid enhancement components. For example, in FIG. 5A, the liquid enhancement component 38 is in the geometric shape of a stick and the storage system 36 stores the liquid enhancement component in a channel shape storage bin either in a vertical or horizontal orientation. The liquid enhancement component 38 may be moved into the storage system 36 by a transfer system that comprises an actuator having a material moving mechanism for moving the liquid enhancement component either by rotation or translation of the material moving mechanism. Examples of material moving mechanisms include belts, augers, vacuum lines, and where appropriate gravity.

In FIG. 5B the liquid enhancement component is introduced into the storage system 36 from the loading system 34 by transfer system of the invention. The liquid enhancement component is stored in a bin or basin-like structure as illustrated. The storage system may be an intermediate or temporary staging or storage location for the liquid enhancement component. The storage system 36 may include a bin or basin-like structure having multiple channels or baffles for storing or holding different types of liquid enhancement components.

FIGS. 5A-5B also illustrate various embodiments of a transfer system 40 for communicating a processed or unprocessed liquid enhancement component between the various systems of the invention. In FIG. 5A, the transfer system 40 includes a motor 70 operably connected to one or more rollers 64 for rotating belt 66. Thus, the liquid enhancement component 38 is released from the storage system 36 and moved between systems of the invention by operation of motor 70 providing rotation to belt 66 for carrying the liquid enhancement component to another system of the invention. The storage system 36 may be configured with one or more types of gates, doors, latches or actuated mechanisms to allow for control of discharging liquid enhancement component from the storage system 36 into the transfer system 40. In one aspect of the invention, the transfer system 40 is configured to communicate a liquid enhancement component 38 to a processing system 42 for processing liquid enhancement component for preparing a complete or final beverage.

FIG. 5B illustrates another embodiment of the transfer system 40 of the invention. In FIG. 5B the transfer system 40 comprises a material transfer channel 40 housing an auger 68 operably connected to motor 70. Rotation of the auger 68 provides movement of the liquid enhancement component 38 through the material transfer channel 44 (e.g., pipe, conduit or other guideway for solid materials) between any one or more of the systems of the invention. For example, the transfer system 40 could be configured so that the material transfer channel 44 connects the storage system 36 with processing system 42 for communicating liquid enhancement component 38 from the storage system 36 to the processing system 42 by operation of auger 68.

Figure 6A:
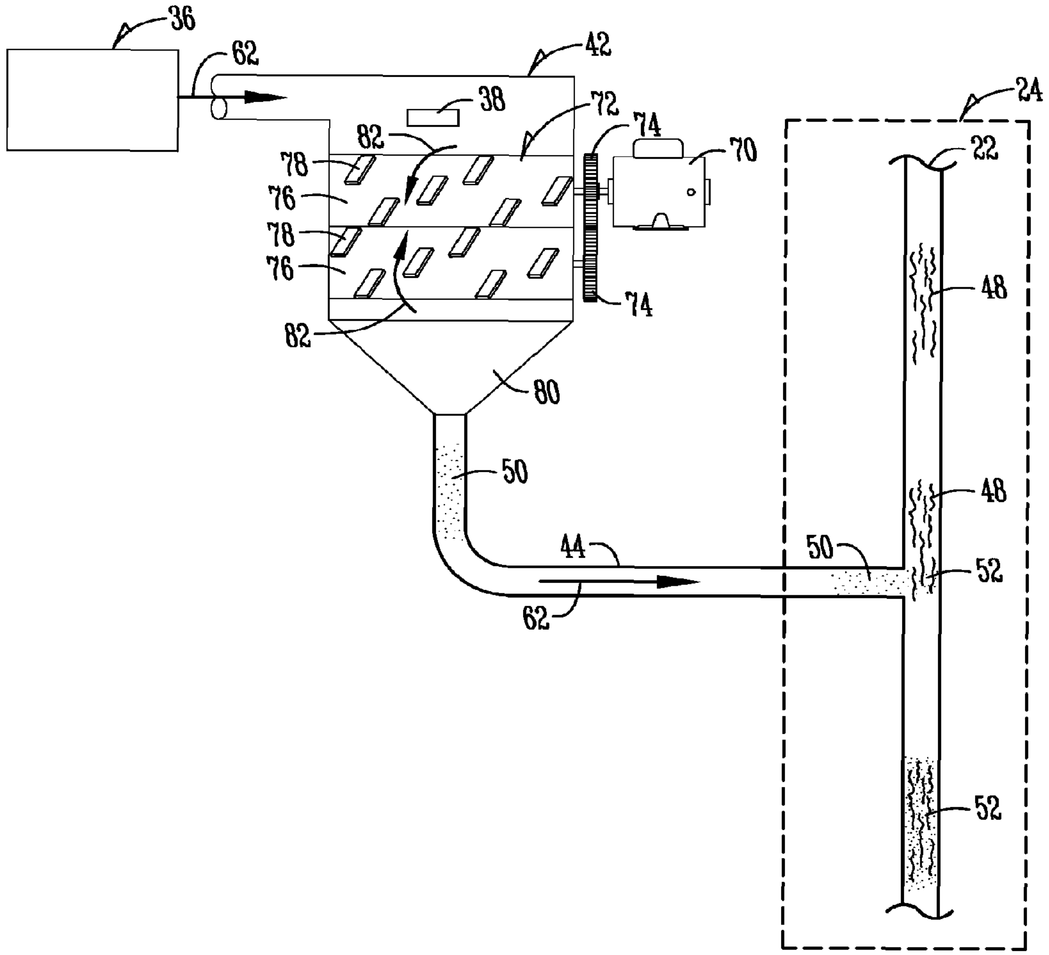
FIG. 6-B are illustrations depicting a processing system for reducing the particle size of a liquid enhancement component according to one aspect of the invention.
Figure 6B:
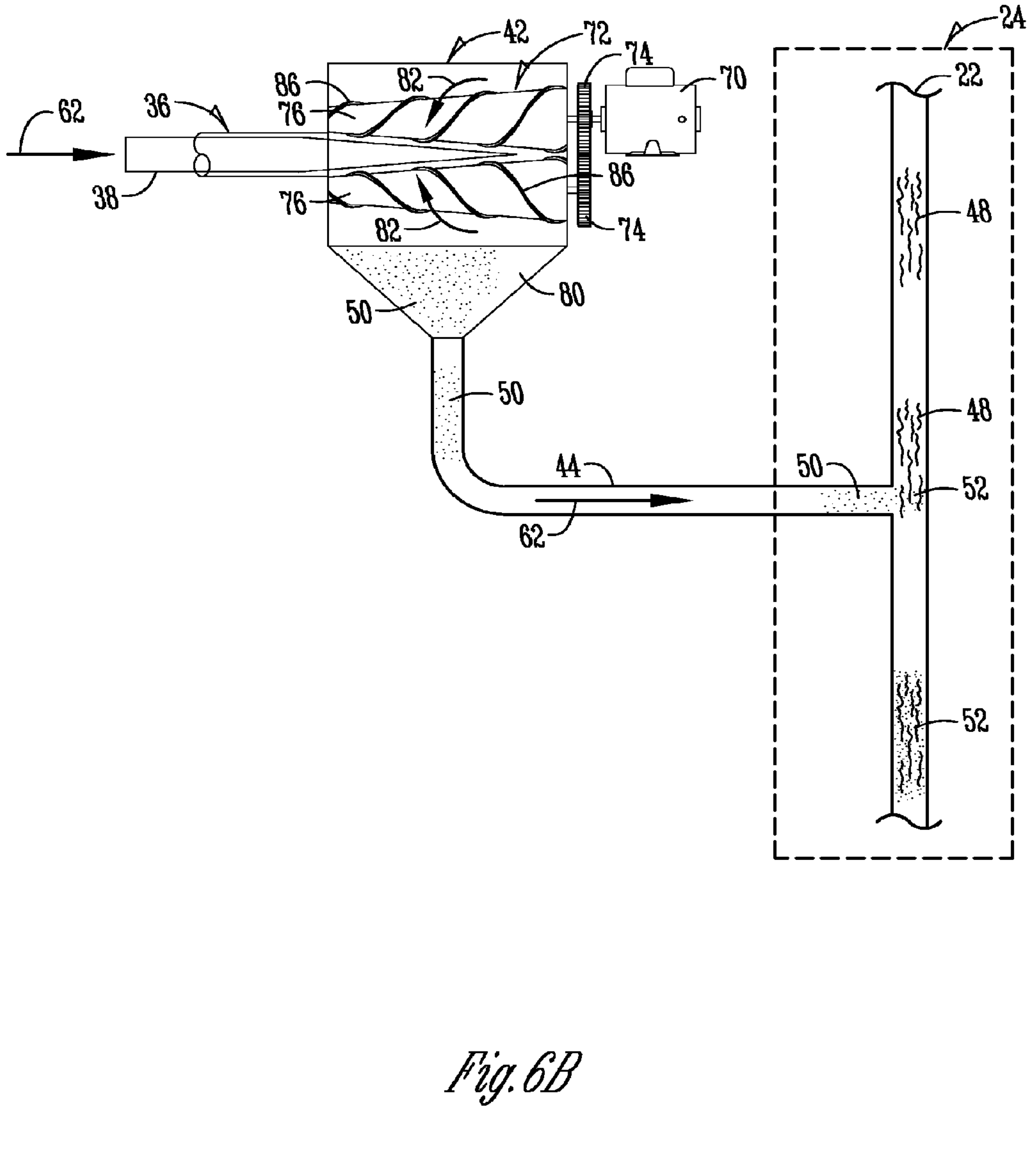

FIG. 6A-B illustrate a processing system according to an exemplary embodiment of the invention. The processing system 42 is preferably in communication with either or both of the loading system 34 and storage system 36 described supra. In one aspect of the invention, the processing system 42 includes a housing having rotatably mounted therein one or more shafts 72 having positioned on their outer peripheral surface a plurality of teeth 76 or blades 86. One or more gears are configured in cooperation with motor 70 and shafts 72 to provide rotation of each shaft as indicated by arrows 82. Liquid enhancement component 38 introduced into the processing system 42 enters the system having a certain geometric size. The processing system reduces the particle size of the liquid enhancement component 38 so as to be more readily dissolvable in a liquid or useable in the preparation of a beverage. The liquid enhancement component 38 is reduced in particle size in part by grinding, crushing, shaving or breaking apart the liquid enhancement component 38 into smaller particles. This is accomplished by rotation of shafts 72 with teeth 76 or blades 86 engaging the liquid enhancement component 38 and breaking it down or shaving it into smaller particle sizes to produce a processed liquid enhancement component 50 for discharging at an outlet of the processing system. FIG. 6A-B illustrate but two processing system 42 of the invention. The invention contemplates the use of other means for reducing the size of the liquid enhancement component to smaller particles, such as grinding, crushing, shaving or breaking apart the liquid enhancement component. The liquid enhancement component 38 could be configured with means for reducing the particle size by intermeshing teeth or bars or other extruded or protruding structures that contact the liquid enhancement component in such a way to grind, crush, shave or break apart the liquid enhancement component into smaller particles. Rotating blades similar to a blender could also be used. Rollers spaced apart to crush the liquid enhancement component 38 could also be configured to reduce the liquid enhancement component in size.

The transfer system 40 may be configured to transfer or meter a certain amount of liquid enhancement component 38 into the processing system 42 based on the desired level of concentration of the finished or completed beverage. For example, an entire stick or a portion of a liquid enhancement component stick may be transferred into the processing system 42 for grinding, crushing or breaking apart into smaller particles to prepare a process liquid enhancement component 50 for use in preparing a beverage (See FIG. 6A). The amount of the unprocessed liquid enhancement component introduced into the processing system 42 may be measured for a specific desirable level of concentration for a final beverage. The liquid enhancement component 50 may take on various solid shapes and/or geometries such as a pencil or the like (See FIG. 6B). In the case where the liquid enhancement component is shaped in the form of a pencil, the processing system 42 may be configured similar to a pencil sharpener. The liquid enhancement component 50 could be inserted into the processing system 42 and the desired amount of the liquid enhancement 50 ground off depending on the size of the drink and/or one's preference for flavor strength. At the outlet of the processing system 42 is a material transfer channel 44 for transferring the process liquid enhancement component 50 for discharging to the beverage preparation system 24 for preparing a finished beverage. The processed liquid enhancement component 50 may be transferred through the material transfer channel 44 using means previously described. The material transfer channel 44 may be connected in communication with a liquid conduit in communication with liquid source 22. Thus, liquid 50 provided from the liquid source through the liquid conduit combines with or is affected by the processed liquid enhancement component 50 to prepare a final or completed beverage 54 for dispensing into a receptacle or cup. Alternatively, the material transfer channel 44 could be configured so as to dispense in parallel with the liquid tube, whereby processed liquid enhancement component 50 is discharged through the material transfer channel 44 into a receptacle or cup either concurrently, before or after dispensement of a charge of liquid from the beverage preparation system 24.

The preferred embodiments of the present invention have been set forth in the drawings and in the specification and although specific terms are employed, these are used in the generically descriptive sense only and are not used for the purpose of limitation. Changes in the formed proportion of parts as well as substitution of equivalence are contemplated as circumstances may suggest or are rendered expedient without departing from the spirit or scope of the invention as further defined in the following claims.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A liquid dispensing appliance comprising:

a cabinet body formed by an outer wall and a compartment disposed within the cabinet body;

a product intake on the outer wall configured to receive a premeasured portion of a liquid enhancement component in a first solid form state and an outlet within the cabinet body configured for dispensing the premeasured portion of the liquid enhancement component in a second solid form state, the intake comprising an operating drawer that is moveable into and out of the intake, whereby the drawer is in an extended position when it is moved out of the intake;

a processing system within the cabinet body, the processing system having a mechanism for reducing the liquid enhancement component into a size more readily dissolvable in a liquid;

a dispenser on the cabinet body having a water conduit with an inlet adapted for fluid communication with a water source and the outlet adapted for fluid communication with a beverage receiving point proximate the outer wall of the cabinet body, the water conduit for carrying a charge of water from the water source; and a liquid enhancement component inlet in the water conduit connected to a liquid enhancement component conduit for receiving the premeasured portion of the liquid enhancement component into the charge of water in the water conduit to create a beverage.

2. The liquid dispensing appliance of claim 1 whereby the operating drawer in the extended position allows access to at least one receiving envelope for the liquid enhancement component.

3. The liquid dispensing appliance of claim 2 whereby the receiving envelope has the same shape as the operating drawer.

4. The liquid dispensing appliance of claim 2 whereby the operating drawer allows access to more than one receiving envelope, whereby each receiving envelope is configured to receive a liquid enhancement component.

5. The liquid dispensing appliance of claim 2 whereby the operating drawer allows access to multiple receiving envelopes.

6. The liquid dispensing appliance of claim 4 whereby each of the liquid enhancement components has a different flavor.

7. The liquid dispensing appliance of claim 4 whereby each of the receiving envelopes is shaped the same as the liquid enhancement component that is received therein.

8. The liquid dispensing appliance of claim 7 whereby each of the liquid enhancement components has a different shape.

9. The liquid dispensing appliance of claim 1 whereby the drawer is manually inserted into the intake.

10. The liquid dispensing appliance of claim 1 whereby the drawer is automatically inserted into the intake.

11. The liquid dispensing appliance of claim 10 whereby the drawer is inserted into the input through inputting a command via a control panel.

12. A liquid dispensing appliance comprising:

a cabinet body formed by an outer wall and a compartment disposed within the cabinet body;

a product intake on the outer wall configured to receive a premeasured portion of a liquid enhancement component in a first solid form state and an outlet within the cabinet body configured for dispensing the premeasured portion of the liquid enhancement component in a second solid form state, the intake comprising a pivoting door that is moveable into and away from the intake, whereby the door is in an extended position when it is moved away from the intake;

a processing system within the cabinet body, the processing system having a mechanism for reducing the liquid enhancement component into a size more readily dissolvable in a liquid;

a dispenser on the cabinet body having a water conduit with an inlet adapted for fluid communication with a water source and the outlet adapted for fluid communication with a beverage receiving point proximate the outer wall of the cabinet body, the water conduit for carrying a charge of water from the water source; and a liquid enhancement component inlet in the water conduit connected to a liquid enhancement component conduit for receiving the premeasured portion of the liquid enhancement component into the charge of water in the water conduit to create a beverage.

13. The liquid dispensing appliance of claim 12 whereby the pivoting door in the extended position allows access to at least one receiving envelope for the liquid enhancement component.

14. The liquid dispensing appliance of claim 13 whereby the receiving envelope has the same shape as the pivoting door.

15. The liquid dispensing appliance of claim 13 whereby the pivoting door allows access to more than one receiving envelope, whereby each receiving envelope is configured to receive a liquid enhancement component.

16. The liquid dispensing appliance of claim 13 whereby the pivoting door allows access to multiple receiving envelopes.

17. The liquid dispensing appliance of claim 15 whereby each of the liquid enhancement components has a different flavor.

18. The liquid dispensing appliance of claim 15 whereby each of the receiving envelopes is shaped the same as the liquid enhancement component that is received therein.

19. The liquid dispensing appliance of claim 18 whereby each of the liquid enhancement components has a different shape.

20. A refrigerator comprising:

a refrigerator cabinet having an outer wall, a compartment disposed within the refrigerator cabinet, and at least one door operatively connected to the refrigerator cabinet for providing access to the compartment;

a liquid conduit within the refrigerator cabinet with an inlet adapted for fluid communication with a liquid source and an outlet at the refrigerator cabinet door adapted for fluid communication with a beverage receiving point and a charge of liquid carried by the liquid conduit from the liquid source to the outlet;

a product intake on the outer wall of the refrigerator cabinet, the product intake configured to receive a premeasured portion of a liquid enhancement component having a first solid form state, said product intake comprising a device selected from the group consisting of an operating drawer and a pivoting door;

a delivery system within the refrigerator cabinet, the delivery system connected in communication with the product intake, the delivery system comprising mechanical means for transferring the premeasured portion of the liquid enhancement component in the first solid form state from the product intake to processing;

a processing system connected in communication with the delivery system, the processing system comprising means for changing the premeasured portion of the liquid enhancement component in the first solid form state to a second solid form state to be more readily dissolvable in a liquid;

a product discharge associated with the refrigerator cabinet, the product discharge connected in fluid communication with the delivery system and configured to disburse the premeasured portion of the liquid enhancement component in the second solid form state into the charge of liquid in the liquid conduit for preparing a beverage;

a dispenser at the refrigerator cabinet door for dispensing the premeasured portion of the liquid enhancement component in the second solid form state with the charge of liquid from the liquid conduit.

* * * * *